US010649298B2

(12) United States Patent
Satoh et al.

(10) Patent No.: US 10,649,298 B2
(45) Date of Patent: May 12, 2020

(54) ELECTROCHROMIC DEVICE AND SMART WINDOW PROVIDED WITH ELECTROCHROMIC DEVICE

(71) Applicant: SHARP KABUSHIKI KAISHA, Sakai, Osaka (JP)

(72) Inventors: Eiji Satoh, Sakai (JP); Nobuyuki Ito, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 153 days.

(21) Appl. No.: 16/076,996

(22) PCT Filed: Dec. 12, 2016

(86) PCT No.: PCT/JP2016/086919
§ 371 (c)(1),
(2) Date: Aug. 9, 2018

(87) PCT Pub. No.: WO2017/141528
PCT Pub. Date: Aug. 24, 2017

(65) Prior Publication Data

US 2019/0049808 A1 Feb. 14, 2019

(30) Foreign Application Priority Data

Feb. 15, 2016 (JP) ................................ 2016-026138

(51) Int. Cl.
*G02F 1/153* (2006.01)
*G02F 1/155* (2006.01)
(Continued)

(52) U.S. Cl.
CPC ............ *G02F 1/155* (2013.01); *E06B 3/6722* (2013.01); *E06B 9/24* (2013.01); *G02F 1/13439* (2013.01);
(Continued)

(58) Field of Classification Search
CPC ........ G02F 1/155; G02F 1/13439; G02F 1/15; G02F 1/1533; G02F 2001/164;
(Continued)

(56) References Cited

U.S. PATENT DOCUMENTS 6,712,999 B2 3/2004 Haering et al.
2014/0220362 A1 8/2014 Milliron et al.
(Continued)

FOREIGN PATENT DOCUMENTS

JP 2014-524055 A 9/2014
JP 2014-525607 A 9/2014

OTHER PUBLICATIONS

Evan L. Runnerstrom et al., "Nanostructured electrochromic smart windows: traditional materials and NIR-selective plasmonic nanocrystals", Chem. Commun., 2014, 50, 10555.

*Primary Examiner* — William Choi
(74) *Attorney, Agent, or Firm* — ScienBiziP, P.C.

(57) ABSTRACT

An electrochromic device having excellent repetitive characteristics is realized. An electrochromic device includes a first transparent electrode arranged on a first substrate, a second transparent electrode arranged on a second substrate, and a nanocrystal layer arranged on the first transparent electrode. An electrolyte is interposed between the nanocrystal layer and the second transparent electrode. The first transparent electrode, the second transparent electrode, and the nanocrystal layer do not cause an oxidation-reduction reaction when a voltage is applied to modulate a transmission spectrum, and do not include an electrode that causes modulation of a transmission spectrum by an oxidation-reduction reaction when a voltage is applied.

9 Claims, 3 Drawing Sheets

100
1
2
3
4
4
7
5
6
9
9
8

(51) Int. Cl.
*G02F 1/15* (2019.01)
*E06B 3/67* (2006.01)
*E06B 9/24* (2006.01)
*G02F 1/1343* (2006.01)
*H02H 7/20* (2006.01)
*E06B 3/663* (2006.01)
*G02F 1/161* (2006.01)

(52) U.S. Cl.
CPC .............. *G02F 1/15* (2013.01); *G02F 1/1533* (2013.01); *H02H 7/20* (2013.01); *E06B 3/66304* (2013.01); *E06B 2009/2464* (2013.01); *G02F 1/161* (2013.01); *G02F 2001/164* (2019.01); *G02F 2201/50* (2013.01); *G02F 2202/36* (2013.01); *G02F 2203/11* (2013.01)

(58) Field of Classification Search
CPC .. G02F 1/161; G02F 2201/50; G02F 2202/36; G02F 2203/11; E06B 3/6722; E06B 9/24; E06B 3/66304; E06B 2009/2464; H02H 7/20
USPC .................................................. 359/265–275
See application file for complete search history.

(56) References Cited

U.S. PATENT DOCUMENTS

2015/0109652 A1 4/2015 Milliron et al.
2017/0031224 A1* 2/2017 Gil ............................ G02F 1/15

* cited by examiner

ELECTROCHROMIC DEVICE AND SMART WINDOW PROVIDED WITH ELECTROCHROMIC DEVICE

TECHNICAL FIELD

The present disclosure relates to a device using an electrochromic material and a smart window provided with the device using the electrochromic material.

BACKGROUND ART

Electrochromic materials capable of changing the optical properties thereof by applying a voltage are known in the related art. As a product using an electrochromic material, a smart window which may adjust the amount of light transmitted by switching between a colored state and a decolored state is known.

Those products using a material that may modulate the transmission spectrum for near-infrared rays are also called smart windows. Since most of the infrared rays from the sun are near-infrared rays, controlling the transmission spectrum for near-infrared rays is almost equal to controlling the acquisition rate of solar heat due to sunlight. In addition, such a smart window may also prevent infrared rays from going outdoors from a room in winter. The wavelength of the infrared rays radiated from the room is about 10 μm, which is classified as far-infrared rays. Accordingly, it is possible to obtain an ideal state in which the heat of the room does not escape as radiant heat by the smart window given the characteristics of reflecting far-infrared rays. In this case, even when the transmission spectrum is controlled so that near-infrared rays do not enter in summer, it is possible to maintain characteristics of reflecting far-infrared rays. Therefore, it is possible to obtain an ideal state in which near-infrared rays and far-infrared rays are prevented from being incident from the outside.

PTL 1 and PTL2 disclose an electrochromic device and an electrochromic nanocomposite thin film capable of shifting the resonance frequency of localized surface plasmon resonance (LSPR) as a means for changing optical properties. PTL 3 discloses an electrochromic device having a nanostructure used in PTL 1 and PTL 2. In addition, NPL 1 discloses individual characteristics of various nanocrystals that may be used as an electrochromic material.

CITATION LIST

Patent Literature

PTL 1: Japanese Unexamined Patent Application Publication (Translation of PCT Application) No. 2014-525607 (published on Sep. 18, 2014)

PTL 2: Japanese Unexamined Patent Application Publication (Translation of PCT Application) No. 2014-524055 (published on Sep. 18, 2014)

PTL 3: U.S. Pat. No. 6,712,999B2 specification (published on Mar. 30, 2004)

Non Patent Literature

NPL 1: Evan L. Runnerstrom et. al., “Nanostructured electrochromic smart windows:traditional materials and NIR-selective plasmonic nanocrystals”, Chem. Commun., 2014, 50, 10555

SUMMARY OF INVENTION

Technical Problem

The electrochromic device described in PTL 1 has a structure requiring a counter electrode containing transition metal oxide. On the other hand, the electro-nanocomposite thin film described in PTL 2 is a structure requiring solid matrix containing metal oxide. Then, in PTL 1 and PTL 2, an oxidation-reduction reaction of the counter electrode and the solid matrix is electrochemically performed in changing the optical properties thereof. This is in order that sufficient charges are taken in and out based on the oxidation-reduction reaction to transfer transparent conductive oxide (TCO) nanostructure to a colored state. However, with respect to the counter electrode and the solid matrix described in PTL 1 and PTL 2, when an impurity such as oxygen is present in the oxidation reaction and the reduction reaction in these cases, side reaction different from the original purpose occurs. It is known that electrochromism by LSPR does not show a clear electrochemical reaction, but, due to the existence of the above side reaction, the structures described in PTL 1 and PTL 2 have a problem that repetitive characteristics against changes in optical properties are deteriorated. In the electrochromic device stack structure shown in FIG. 2 of NPL 1 as well, since the counter electrode material is indispensable, similarly to the electrochromic device of PTL 1, there is a problem that repetitive characteristics are deteriorated.

The present invention has been made in view of the above problems, and an object thereof is to realize an electrochromic device having excellent repetitive characteristics.

Solution to Problem

In order to solve the above problem, the electrochromic device according to one aspect of the present invention is an electrochromic device that modulates a transmission spectrum by applying a voltage, including a first transparent electrode arranged on a first substrate, a second transparent electrode arranged on a second substrate, and a nanocrystal layer arranged on the first transparent electrode. The nanocrystal layer and the second transparent electrode are arranged to face each other, and an electrolyte is interposed between the nanocrystal layer and the second transparent electrode. The first transparent electrode, the second transparent electrode, and the nanocrystal layer do not cause an oxidation-reduction reaction when a voltage is applied to modulate a transmission spectrum, and do not include a material that causes modulation of a transmission spectrum by an oxidation-reduction reaction when a voltage is applied.

Advantageous Effects of Invention

According to one embodiment of the present invention, it is possible to realize an electrochromic device which does not include a counter electrode material. Therefore, no side reaction derived from the oxidation-reduction reaction of the counter electrode material occurs and an electrochromic device having excellent repetitive characteristics may be realized.

DESCRIPTION OF EMBODIMENTS

Embodiment 1

Figure 1:
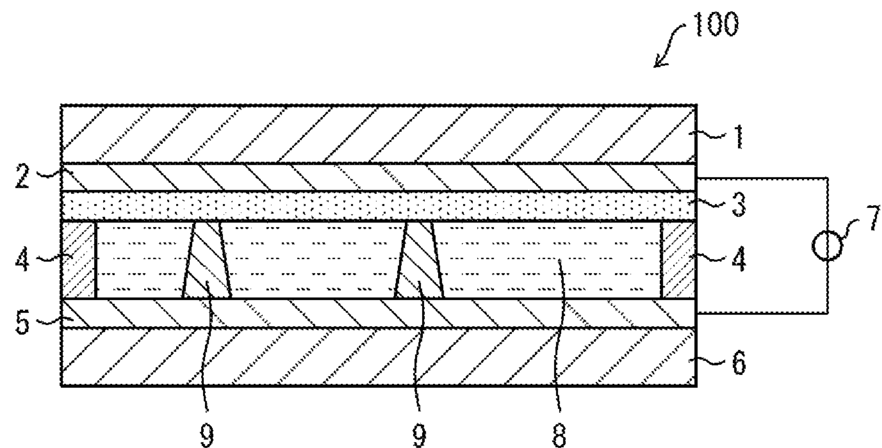
FIG. 1 is a cross-sectional view of an electrochromic device according to Embodiment 1 of the present invention.

With reference to FIG. 1, an electrochromic device 100 according to the present embodiment will be described. FIG. 1 is a cross-sectional view of the electrochromic device 100 as seen from the side, and the side of a first substrate 1 is defined as an upper side. The electrochromic device 100 includes the first substrate 1, a first transparent electrode 2, a nanocrystal layer 3, a seal 4, a second transparent electrode 5, a second substrate 6, a power supply 7, an electrolyte solution 8, and a spacer 9. The combination of the first substrate 1 and the first transparent electrode 2 and the combination of the second transparent electrode 5 and the second substrate 6 are referred to as a substrate with the first transparent electrode and a substrate with the second transparent electrode, respectively. In addition, a region partitioned by the seal 4 is defined as a cell.

The first substrate 1 is colorless and transparent for light and protects and supports the first transparent electrode 2. The first substrate 1 may be made of, for example, a glass, and in addition, may be made of a resin such as polyethylene terephthalate (PET) or polyimide. In addition, the above structure may be constituted by further providing a gas barrier layer of an inorganic material and/or an organic material. In the case of using a glass, the first substrate 1 may be thinned by etching after cell formation.

The first transparent electrode 2 is colorless and transparent for light, connected to the power supply 7, and applies a voltage to the second transparent electrode 5. Specifically, in the first transparent electrode 2, in addition to titanium-doped indium oxide (InTiO), it is possible to use a material that transmits near-infrared rays, such as tantalum substituted tin oxide with a seed layer of anatase type titanium dioxide, tin-doped indium oxide (ITO) with controlled carrier density, or the like. It is also possible to manufacture the first transparent electrode 2 as a single body, but it is possible to manufacture the first transparent electrode 2 as a substrate with the first transparent electrode by using a sputtering method, a vapor deposition method, a coating method, or the like on the first substrate 1 to form a transparent conductive film.

The nanocrystal layer 3 is a layer constituted by nanocrystals which are particulate crystals having a particle diameter of several nm to several tens nm. When a voltage is applied between the first substrate 1 and the second substrate 6, the nanocrystal layer 3 is constituted by an electrochromic material whose transmission spectrum is changed by LSPR when charge is injected or charge is extracted. Specifically, in addition to ITO nanocrystals, a material that is substantially transparent in a visible light region, such as aluminum-doped zinc oxide (AZO), gallium-doped zinc oxide (GZO), or the like, may be used for the nanocrystal layer 3. Further, a material having absorption in the visible light region such as composite tungsten oxide represented by $CsxWyO_3$ (x and y are composition ratios), lanthanum hexaboride, or the like may also be used.

The manufacturing method of the nanocrystal layer 3 may be anything. As an example, the nanocrystal layer 3 is manufactured by applying ITO nanocrystals or the like on the first transparent electrode 2 and baking the first transparent electrode 2. In this case, as a coating method, spin coating with toluene dispersion liquid or a printing method with a paste to which a vehicle is appropriately added may be used. Then, in the case of spin coating with ITO toluene dispersion liquid, baking is performed at a temperature of 200° C. to 300° C. for 30 minutes. Here, the temperature used for baking is a temperature at which organic components on the surface of the nanocrystals are removed and baking is appropriately performed. This is because if the baking temperature is too high, baking proceeds excessively and LSPR may not be obtained at a desired wavelength. On the contrary, in a case where the temperature is too low, the resistance between the nanocrystals is large and it is difficult for electrons to be injected, or it is difficult for electrons to be extracted.

The seal 4 seals the electrolyte solution 8 between the nanocrystal layer 3 and the second transparent electrode 5. Specifically, the seal 4 is a combination of a UV curable resin, more preferably a sealing material having solvent resistance inside in contact with the electrolyte solution 8, and a sealing material having strong adhesion on the outer side. After bonding a substrate with the first transparent electrode and a substrate with the second transparent electrode by the seal 4, it is possible to obtain the electrochromic device 100 having a high sealing strength and less bleeding of the sealing material by curing the seal 4. In any case, the gap of the cell may be formed by mixing a glass fiber or the like having a constant diameter into the sealing material.

The second transparent electrode 5 is colorless and transparent for light, connected to the power supply 7, and applies a voltage between the second transparent electrode 5 and the first transparent electrode 2. The second transparent electrode 5 may be manufactured by a method similar to that of the first transparent electrode 2. The first transparent electrode 2 and the second transparent electrode 5 may be manufactured from the same material or may be manufactured from different materials, respectively, but it is desirable to manufacture from the same material to reduce manufacturing costs.

The second substrate 6 is colorless and transparent for light and protects and supports the second transparent electrode 5. The second substrate 6 is manufactured by the same method as the first substrate 1.

The power supply 7 is connected to the first transparent electrode 2 and the second transparent electrode 5, respectively, and applies a voltage between the first transparent electrode 2 and the second transparent electrode 5. The power supply 7 may be anything as long as the nanocrystal layer 3 applies a voltage necessary for switching between a colored state and a decolored state.

The electrolyte solution 8 causes bias in electric field intensity by the voltage applied by the power supply 7. The electrolyte in the electrolyte solution 8 may be any material as long as the material is easily ionized, but it is desirable that the electrolyte is a material which is less likely to cause an oxidation-reduction reaction within the range of the voltage applied by the power supply 7. Further, the solvent constituting the electrolyte solution 8 is also preferably a material which is less likely to cause an oxidation-reduction reaction. In addition, the electrolyte solution 8 preferably does not contain a material such as ferrocene which is likely to cause an oxidation-reduction reaction. Specifically, lithium hexafluorophosphate ($LiPF_6$) or sodium hexafluorophosphate ($NaPF_6$) or the like may be used as an electrolyte, and ethylene carbonate (EC), diethyl carbonate (DEC), a mixture of the above EC and DEC, propylene carbonate or the like may be used as a solvent. In addition, a gel in which polyvinyl butyral or the like is dissolved may be used. Further, an ionic liquid constituted by a cyclic quaternary ammonium cation and an imide anion may be used.

Here, the susceptibility to the oxidation-reduction reaction is determined based on the combination of the oxidation-reduction potential of the substances constituting the electrolyte solution 8. Since the electrochromic device 100 according to this embodiment does not include a standard electrode, the oxidation-reduction reaction occurring in the electrochromic device 100 is based on the voltage applied to the two electrodes that face each other (the first transparent electrode 2 and the second transparent electrode 5). At this time, the range of the voltage which causes the oxidation-reduction reaction depends on the temperature of the substance constituting the electrolyte solution 8, the kind of the material used for the electrode, the kind of the solvent used for the electrolyte solution 8, and the like. In addition, the range of the voltage depends on the magnitude of the oxidation-reduction potential of the solute in the electrolyte solution 8 for a standard hydrogen electrode (SHE), a saturated calomel electrode (SCE), and the like. That is, oxidation-reduction reaction is less likely to occur when the electrolyte solution 8 is constituted by using a substance having a large absolute value of the oxidation-reduction potential for SHE, SCE, and the like. For example, the oxidation-reduction potential for SCE is 7 when the oxidation potential of $LiPF_6$ is +3.8 V and the oxidation potential of lithium tetraphenylborate ($LiBPh_4$) is +1.0 V. Therefore, it is possible to suppress the occurrence of the oxidation-reduction reaction constituting a solute in the electrolyte solution 8 using $LiPF_6$ instead of $LiBPh_4$. In addition, the oxidation-reduction potential for SHE is Li+=3.045 V and ferrocene is approximately +0.7 V. Therefore, in the electrolyte solution 8 using Li, even if the voltage setting is such that a Li+ reaction does not occur, an oxidation-reduction reaction occurs when a substance such as ferrocene are introduced, and therefore it is preferable not to mix such a substance.

The spacer 9 keeps a distance in between the substrate with the facing first transparent electrode and the substrate with the second transparent electrode constant. The spacer 9 may be anything as long as the spacer 9 is electrochemically stable within the range of the voltage applied by the power supply 7 and may be a photo spacer or the like used in a liquid crystal display, for example. The size of the spacer 9 is any size, but in a case where a low viscosity material is used for the electrolyte solution 8, it is preferable to apply a photosensitive resin on the second transparent electrode 5 and to provide the spacer 9 having, for example, a square bottom surface with a side of 10 μm and a height of 10 μm by a photolithography step in order to secure the thickness of the cell. In the illustrated example, the spacer 9 is in contact with the nanocrystal layer 3 and the second transparent electrode 5, respectively, but any arrangement may be used as long as the distance between the substrate with the first transparent electrode and the substrate with the second transparent electrode may be kept constant. For example, the spacer 9 may be in contact with the first transparent electrode 2 and the second transparent electrode 5, respectively.

An example of the manufacturing method of the electrochromic device 100 according to Embodiment 1 will be described below.

First, the first substrate 1 and the second substrate 6 are prepared from a colorless and transparent glass material. Next, on the one side of the first substrate 1 and the second substrate 6, the first transparent electrode 2 and the second transparent electrode 5 are formed, respectively by forming InTiO so that the near-infrared region becomes transparent by a sputtering method. Further, in order to construct the nanocrystal layer 3 on the first transparent electrode 2, toluene dispersion liquid of ITO nanoparticles (particle diameter 6 to 15 nm, In:Sn composition ratio=85:15) is applied by spin coating to the first transparent electrode 2, dried on a hot plate at 140° C. for 1 minute, and then baked at 200° C. for 30 minutes.

Then, after the spacer 9 is formed on the second transparent electrode 5 by the photolithography step, a UV curable resin prepared by mixing 2 wt % of a spacer resin having a particle diameter of 10 μm as a sealing material is applied on the circumference of either one of the nanocrystal layer 3 or the second transparent electrode 5 in a state in which an injection port is partially provided. When the UV curable resin is applied, and then laminated to the other and irradiated with ultraviolet rays, the resin is cured to form the seal 4, an empty cell whose inside is hollow may be obtained.

For the empty cell, after injecting an EC:DEC=1:2 mixture solution containing 1 mol/L of $LiPF_6$ as the electrolyte solution 8 from the injection port, the injection port is filled with the UV curable resin and cured by ultraviolet rays. As a result, the electrolyte solution 8 is hermetically sealed inside the cell by the seal 4.

Through the above steps, it is possible to obtain the electrochromic device 100 according to Embodiment 1.

In the case where the first substrate 1 and the second substrate 6 are plastic substrates, since the steps of laminating the nanocrystal layer 3 and the second transparent electrode 5 by a roll-to-roll method with the seal 4 may be a series of steps, it is possible to reduce the manufacturing cost. In addition, it is possible to suppress contamination of impurities such as oxygen, water, or the like in the manufacturing step and enhance the reliability of the cell by performing a series of steps under a deoxygenated drying atmosphere.

Figure 2:
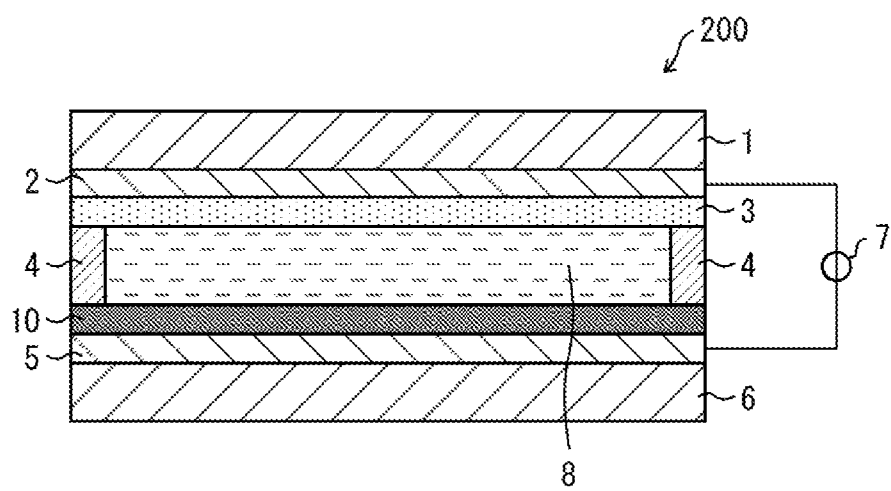
FIG. 2 is a cross-sectional view of the electrochromic device having a counter electrode material.
Figure 3:
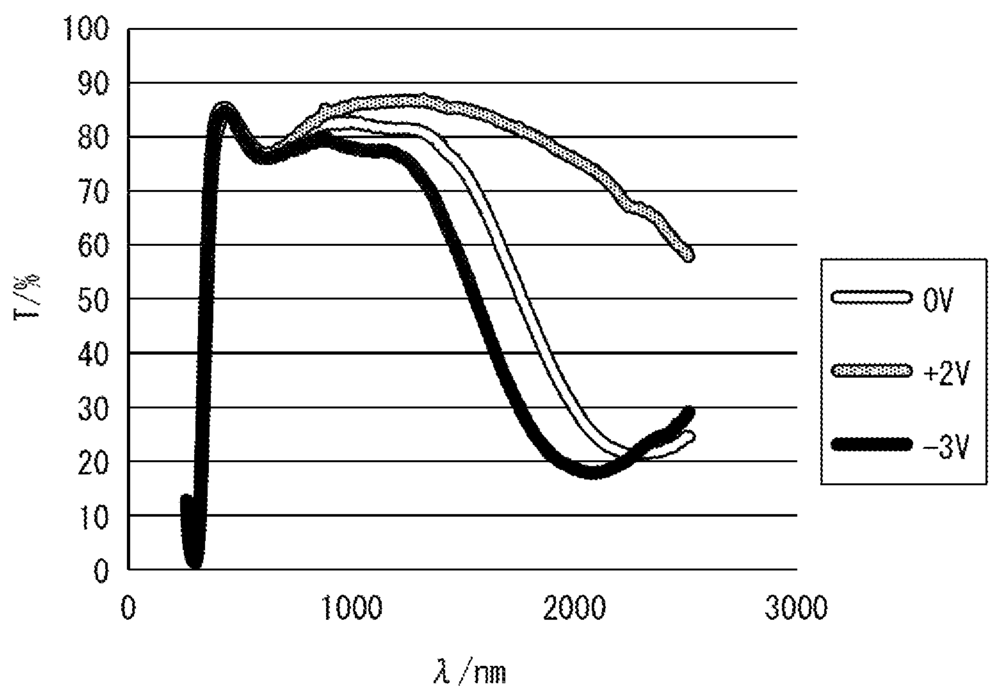
FIG. 3 is a view showing a transmission spectrum in the electrochromic device according to Embodiment 1 of the present invention, in which a horizontal axis indicates a wavelength and a vertical axis indicates transmittance.
Figure 4:
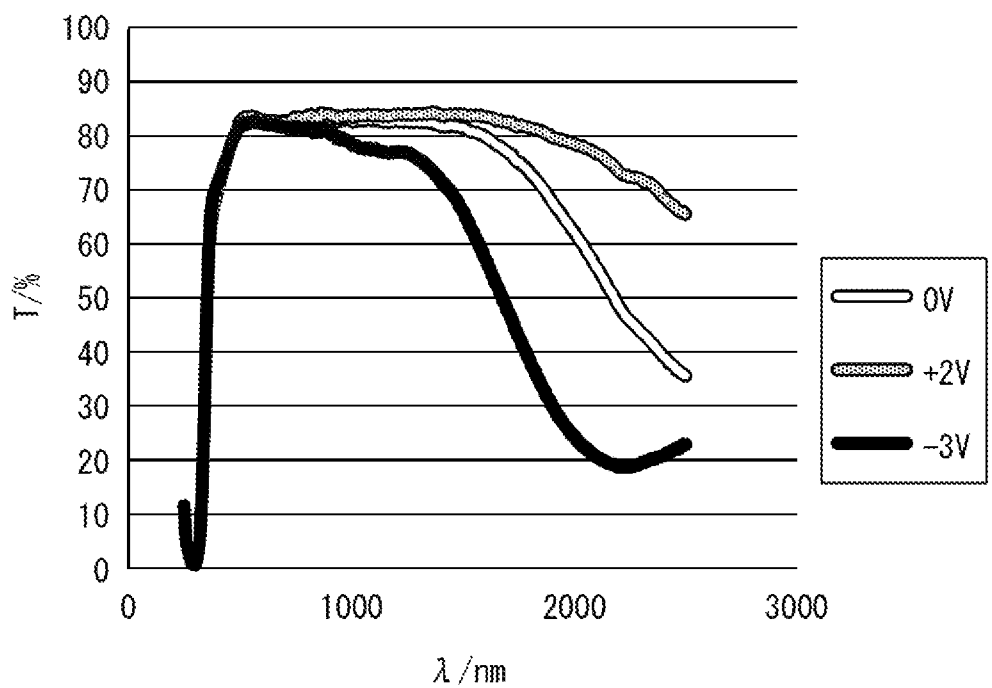
FIG. 4 is a view showing a transmission spectrum in the electrochromic device having a counter electrode material, in which the horizontal axis indicates the wavelength and the vertical axis indicates the transmittance.

Hereinafter, the operating principle of the electrochromic device 100 according to Embodiment 1 will be described with reference to FIGS. 1 to 4. As a reference example, FIG. 2 is a cross-sectional view of an electrochromic device 200 having a counter electrode material similar to the document of the related art, and the upper side of the first substrate 1 is defined as an upper side. FIG. 3 is a graph showing a relationship between the wavelength and the transmittance of the transmission spectrum with respect to the DC voltage of the first transparent electrode 2 of the electrochromic device 100 according to Embodiment 1. The potential of the second transparent electrode 5 is set to 0 V. The horizontal axis shows the wavelength of the incident light, and the vertical axis shows the transmittance. FIG. 4 is a graph showing a relationship between the wavelength and the transmittance of the transmission spectrum with respect to the DC voltage of the first transparent electrode 2 of the electrochromic device 200 having the counter electrode material. The potential of the second transparent electrode 5 is set to 0 V. The horizontal axis shows the wavelength of incident light, and the vertical axis shows transmittance.

It is known that the transmission spectrum in the near-infrared region may be modulated by injecting electrons into transparent conductive oxide (TCO) nanostructure. This principle is as follows. When electrons are injected, the electron density of the transparent conductive oxide (TCO) nanostructure changes and the resonance frequency of the LSPR changes. Therefore, before and after the change, the transparent conductive oxide nanostructure may absorb (plasmon absorption) light having a wavelength corresponding to another different resonance frequency. That is, ITO nanocrystals perform plasmon absorption in the near-infrared region and have spectral selectivity by injection of electrons. It is known that a resonance frequency $\omega_{LSPR}$ of the LSPR is proportional to a bulk plasma frequency $\omega_p$ of the electron, and $\omega_p$ is given by the following equation.

$$\omega_p^2 = N \cdot e^2/(m \times \varepsilon_0)$$

where N is the electron density, e is the charge of the electron, m is the effective mass of the electron, and $\varepsilon_0$ is dielectric constant of the vacuum. It can be seen from the above equation that the bulk plasma frequency $\omega_p$ increases when N is increased in the above equation, that is, when a negative voltage is applied to the transparent conductive oxide (TCO) nanostructure and the electron density is increased. Therefore, the resonance frequency $\omega_{LSPR}$ of the LSPR proportional to the bulk plasma frequency $\omega_p$ also increases, and a resonance wavelength $\lambda_{LSPR}$ of the LSPR becomes short. As a result, when electrons are injected into the transparent conductive oxide (TCO) nanostructure, the plasmon absorbed wavelength $\lambda_{LSPR}$ is shifted to a short wavelength and the transmission spectrum is modulated in the near-infrared region. At this time, in the transmission spectrum, when the voltage applied to the transparent conductive oxide (TCO) nanostructure increases, the peak of the optical density shifts to a longer wavelength side. That is, as the electron density of the transparent conductive oxide (TCO) nanostructure decreases by applying a voltage, the resonance wavelength $\lambda_{LSPR}$ of the LSPR is shifted to the longer wavelength side and the optical density is decreased due to the plasmon absorption.

In addition, in any of the related arts PTL 1, PTL 2, and NPL 1, a constitution requiring a counter electrode by a material that may cause an oxidation-reduction reaction is disclosed. PTL 1 describes that an electrochromic film and transition metal oxide may be included as a counter electrode. PTL 2 describes that the counter electrode is capable of storing sufficient charge, and in a case where the counter electrode has sufficient conductivity, the counter electrode may also function as an adjacent transparent conductor. These substances used as a counter electrode material are substances that cause an oxidation-reduction reaction by application of a voltage.

Next, with reference to FIG. 2, the electrochromic device 200 having a counter electrode material will be described. FIG. 2 is a cross-sectional view of the electrochromic device 200 as seen from the side, and the side of the first substrate 1 is defined as an upper side. Although the basic configuration of the electrochromic device 200 is the same as that of the electrochromic device 100 of FIG. 1, the electrochromic device 200 further includes a counter electrode material 10 whole omitting the spacer 9.

The counter electrode material 10 performs an oxidation-reduction reaction by application of a voltage. Specifically, Cerium oxide ($CeO_2$) is shown to be useful as a counter electrode material in NPL 1.

The method of manufacturing the electrochromic device 200 having the counter electrode material shown in FIG. 2 will be described below with respect to changes from the manufacturing method of the electrochromic device 100 according to Embodiment 1.

In the electrochromic device 200 having the counter electrode material, the counter electrode material 10 is formed by forming $CeO_2$ by a sputtering method after forming the second transparent electrode 5 on the second substrate 6. Then, the electrochromic device 200 may be obtained by forming the seal 4 by using the UV curable resin so that the nanocrystal layer 3 and the counter electrode material 10 face each other and sealing the electrolyte solution 8 inside the cell.

As described above, it is known that LSPR does not show a distinct electrochemical reaction. Therefore, in the electrochromic device 100 according to Embodiment 1, which does not include the material of the counter electrode constituted by the substance causing the oxidation-reduction reaction, it is possible to avoid deterioration of repetitive characteristics due to a side reaction of the oxidation-reduction reaction. The electrochromic device 100 may modulate the wavelength $\lambda_{LSPR}$ that is plasmon absorbed in the near-infrared region by the charge transfer on the first transparent electrode 2 and the second transparent electrode 5 generated in a case where a voltage is applied. Therefore, it was verified whether or not it is possible to modulate the wavelength $\lambda_{LSPR}$ in the configuration of the electrochromic device 100 according to Embodiment 1. Verification is a control experiment for the electrochromic device 100 according to Embodiment 1 and the electrochromic device 200 having a counter electrode material, and the results are shown in FIGS. 3 and 4, respectively.

From FIGS. 3 and 4, it was possible to confirm that there is no large difference in the shift range of the transmission spectrum of the electrochromic devices 100 and 200 in a case where the voltage of the first transparent electrode 2 is 2 V and −3 V. On the other hand, for the transmission spectrum in the case of 0 V, the transmittance greatly differs in the region where the wavelength $\lambda$ is 1400 nm or more, but the difference is considered to be caused due to the presence or absence of the counter electrode material 10. Since the work function of the nanocrystal layer 3 is different from the work function of the second transparent electrode 5, in the state connected by the electrolyte solution 8, a slight potential difference is generated therebetween. Specifically, the difference in the work functions between the nanocrystal layer 3 and the second transparent electrode 5 in the electrochromic device 100 is different from the difference in the work functions between the nanocrystal layer 3 and counter electrode material 10 in the electrochromic device 200. As a result, a potential difference between the nanocrystal layer 3 and the second transparent electrode 5 when the voltage of the first transparent electrode 2 is 0 V is different, and as a result, the difference is considered to have appeared as a difference with respect to the region of the transmission spectrum.

From the above results, the electrochromic device 100 according to Embodiment 1 which does not have the counter electrode material 10 may modulate the transmission spectrum in the near-infrared region by applying a voltage. Therefore, even when the oxidation-reduction reaction is not performed, electrochromism by LSPR may be realized. Since the electrochromic device 100 is transparent, the electrochromic device 100 is suitable for a smart window, and the smart window provided with the electrochromic device 100 modulates the transmission spectrum in the near-infrared region and has excellent repetitive characteristics. At this time, the smart window may further include a switch for applying a voltage at a timing desired by a user and modulating the transmission spectrum. In this case, the user may operate the switch at a desired timing to modulate the transmission spectrum in the near-infrared region with respect to the electrochromic device 100 in the smart window. Therefore, the smart window provided with the electrochromic device 100 may control the acquisition rate of solar heat due to sunlight and obtain an ideal state in which radiant heat is prevented from escaping from the room.

In Embodiment 1 the electrochromic device 100 using the electrolyte solution 8 and the spacer 9 has been described. However, according to the configuration of the electrochromic device 100, there is a possibility of causing a problem in switching between the colored state and the decolored state at the boundary between the spacer 9 and the first transparent electrode 2 and the nanocrystal layer 3. Specifically, in a case where the spacer 9 as shown in FIG. 1 is formed on the nanocrystal layer 3, the residues of the photolithography step of the spacer 9 may remain on the nanocrystal layer 3 and inhibit switching of the transmission spectrum. In addition, in a case where the spacer 9 is formed on the first transparent electrode 2, since the spacer 9 is present before the nanocrystal layer 3 is formed on the first transparent electrode 2, there is a possibility that the nanocrystal layer 3 becomes uneven or the nanocrystals cover the spacer 9 and leaks to the second transparent electrode 5 as a result. Therefore, in Embodiment 2, an electrochromic device 300 not using the spacer 9 will be described.

Embodiment 2

Figure 5:
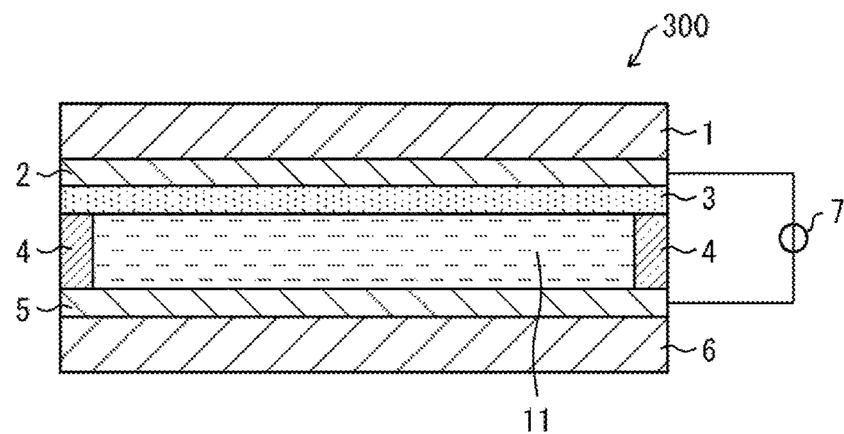
FIG. 5 is a cross-sectional view of an electrochromic device according to Embodiment 2 of the present invention.

Another embodiment of the present invention will be described with reference to FIG. 5. For the convenience of explanation, members having the same functions as those described in the above embodiment are denoted by the same reference numerals, and description thereof is omitted. The electrochromic device 300 according to the present embodiment is provided with the new solid electrolyte 11 in place of the electrolyte solution 8 and the spacer 9 in the configuration of the electrochromic device 100 of Embodiment 1.

The solid electrolyte 11 may be any material as long as the material is easily ionized, but it is desirable that the solid electrolyte 11 is a material that does not undergo the oxidation-reduction reaction within the range of the voltage applied by the power supply 7 and has elasticity. Specifically, the solid electrolyte 11 may be a solid electrolyte such as polyethylene oxide containing a lithium salt, or a soft viscous crystal.

According to the above configuration, since the spacer 9 is unnecessary, it is possible to switch between the colored state and the decolored state in the region where the spacer 9 is present in Embodiment 1 as well as the other regions.

The manufacturing method of the electrochromic device 300 according to Embodiment 2 will be described with respect to changes from the manufacturing method of the electrochromic device 100 of Embodiment 1.

The first transparent electrode 2 is formed on one side of the first substrate 1 and the nanocrystal layer 3 is further formed thereon, and after the second transparent electrode 5 is formed on one side of the second substrate 6, the solid electrolyte 11 is coated on the nanocrystal layer 3 and dried. After coating and drying of the solid electrolyte 11 is completed, a UV curable resin mixed with 2 wt % of a spacer resin of 10 μm as a sealing material is applied on the circumference of either the nanocrystal layer 3 or the second transparent electrode 5 so as to seal the solid electrolyte 11. When the UV curable resin is applied, and then overlapped with the other and irradiated with ultraviolet rays, the resin is cured to form the seal 4, and the cell of the electrochromic device 300 may be obtained.

Modification Example

Figure 7:
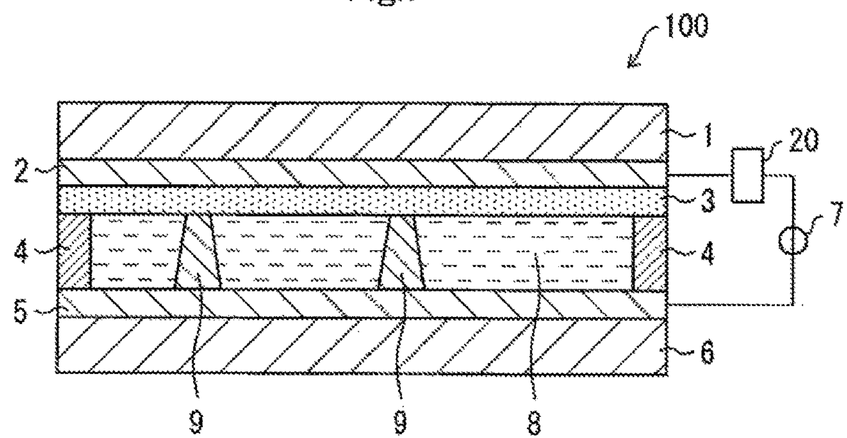
FIG. 7 is a cross-sectional view of an electrochromic device including an overcurrent protection circuit between a power supply and a first transparent electrode according to a modification example of the present invention.

In each of the above embodiments, the electrochromic device has a configuration including a circuit in which the power supply 7 is connected in series, but in order to suppress reactions other than electrochromism by LSPR, in a case where a current exceeding a predetermined threshold is detected between the first transparent electrode 2 and the second transparent electrode 5 before and after the power supply 7, the electrochromic device may further include an overcurrent protection circuit that disconnects the connection between the electrodes so that no current flows between the electrodes or switches the connection destination of the power supply 7 to a circuit different from the circuit connecting the electrodes. FIG. 7 is a cross-sectional view of a circuit including the electrochromic device 100 having an overcurrent protection circuit 20 between the power supply 7 and the first transparent electrode 2, as seen from the side. According to the illustrated example, the configuration of the electrochromic device 100 is the same as that of Embodiment 1. For example, when there is a possibility that a side reaction including an oxidation-reduction reaction occurs in the electrochromic device 100, the overcurrent protection circuit 20 may suppress or interrupt the current flowing to the electrochromic device 100.

Even when each member constituting the electrochromic device is configured not to perform an oxidation-reduction reaction within the range of the voltage applied by the power supply 7, side reactions including an oxidation-reduction reaction may occur due to impurities and the like generated by manufacturing and/or switching of the transmission spectrum. In such a case, in a case where the current flowing in the circuit exceeds a predetermined threshold value due to the current generated by the side reactions in the overcurrent protection circuit, it is possible to suppress the side reactions and to prevent cell deterioration by preventing the current from flowing in the electrochromic device. In addition, if a short circuit occurs due to physical damage or the like, an abnormality such as heat generation and the like may be prevented by the overcurrent protection circuit.

The predetermined threshold for the current detected by the overcurrent protection circuit need not always be a constant value. For example, the predetermined threshold value may be varied depending on the energization time for the electrochromic device. An elapsed time t from when voltage application to the electrochromic device is started or when the polarity of the applied voltage is inverted is considered. At this time, in a case where the electrochromic device in which the first transparent electrode 2 and the second transparent electrode 5 face each other is regarded as a capacitor, a large current flows during charging of the electrochromic device. With respect to this charging period $t_c$, for example, the current at $t_c$=5s is $I_a$. At this time, for example, it is possible to prevent abnormalities such as heat generation and the like when a short circuit occurs by controlling the current by the overcurrent protection circuit so as not to exceed $I_a$=1A when the area of the electrodes (the first transparent electrode 2 and the second transparent electrode 5) is 1 $m^2$. Further, in the period exceeding $t_c$, since the charging of the electrochromic device is completed, the large current $I_a$ during charging does not flow. Therefore, it is possible to suppress the oxidation-reduction reaction of the substance between the electrodes from occurring by controlling the current by the overcurrent protection circuit so as not to exceed a current $I_b$ smaller than $I_a$, for example, $I_b$=100 mA. For example, a constant current circuit in which a set value is $I_a$ and a constant current circuit in which a set value is $I_b$ are provided, the current control may be realized by selecting one of these two constant current circuits with a switch having a timer function. However, since $t_c$, $I_a$, and $I_b$ depend on the distance between the transparent electrodes, the areas of the transparent electrodes, and the like, the predetermined threshold values ($I_a$ and $I_b$) may be set according to the distance between the transparent electrodes and the areas of the transparent electrodes. In this manner, the overcurrent protection circuit may set a threshold value of the current as a first threshold value during a predetermined period from the start of charging and set the threshold value of the current as a second threshold value smaller than the first threshold value after a predetermined period of time. Control of the current by the overcurrent protection circuit may be performed by a current restriction or by the control to lower the absolute value of the applied voltage.

Further, the overcurrent protection circuit may be configured to control the current flowing between the first transparent electrode 2 and the second transparent electrode 5 consideration of other elements of the current as long as side reactions may be suppressed and cell deterioration may be prevented. For example, the integrated value of the current, that is, the charge amount from the time when the voltage is applied or the polarity of the applied voltage is inverted may be reflected in the control. A product CV of a predetermined voltage V applied between the transparent electrodes and an electrostatic capacitance C formed between the two transparent electrodes is the charge amount charged in each transparent electrode. This charge amount CV or the charge amount CV multiplied by a coefficient (preferably, 1 or more) may be used as a charge amount threshold value. The overcurrent protection circuit specifies the charge amount charged in the transparent electrode from the applied current and the elapsed time t. In a case where the charged amount of charge exceeds the charge amount threshold value, the overcurrent protection circuit may stop applying the voltage between the transparent electrodes (disconnect the connection between the transparent electrode and the power supply 7) or decrease the absolute value of the applied voltage. In this way, it is possible to suppress the oxidation-reduction reaction of the substance between the transparent electrodes of the electrochromic device. For example, in a case where the coefficient is set to 1.5, the overcurrent protection circuit may limit the applied voltage after sufficient charge is charged between the transparent electrodes after polarity inversion.

Figure 6:
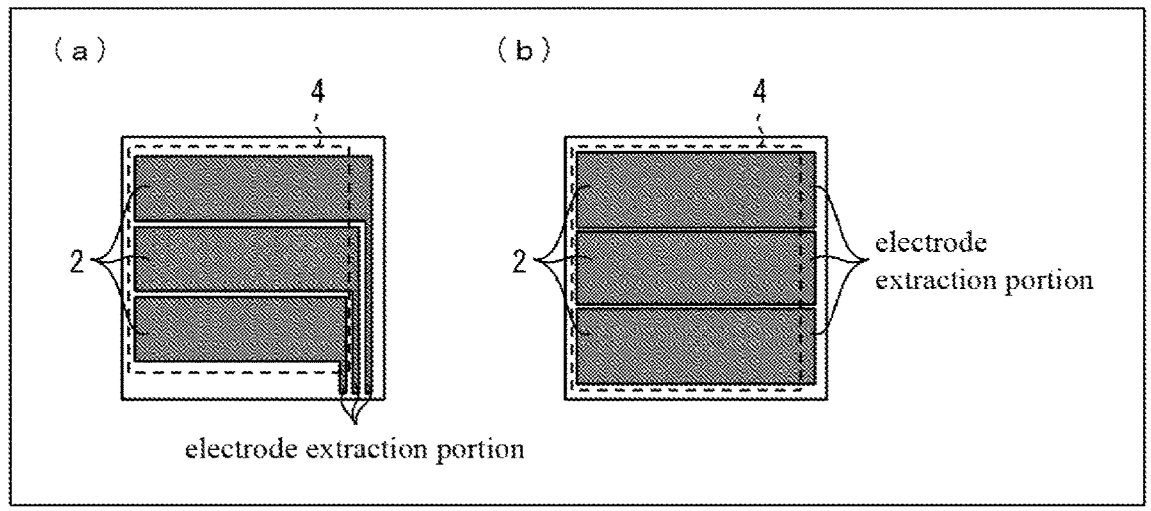
FIG. 6 is a configuration diagram of a smart window using the electrochromic device according to Embodiments 1 and 2 of the present invention, (a) of FIG. 6 shows a configuration in which a transparent electrode is divided into a plurality of sub-electrodes with for the electrochromic device, and the electrode extraction portions of respective sub-electrodes are gathered at one place, and (b) of FIG. 6 shows a configuration in which the transparent electrode is divided into a plurality of sub-electrodes for the electrochromic device, and the electrode extraction portions of respective sub-electrodes are set at a plurality of positions.

In each of the embodiments described above, a configuration in which one cell of the electrochromic device includes only one first transparent electrode 2 has been described, but a configuration in which a plurality of the first transparent electrodes 2 included for one cell may be used. As a specific example, for a product having a dimming portion (laminated region of the first transparent electrode 2, the nanocrystal layer 3, and the second transparent electrode 5 and the electrolyte solution 8 or the solid electrolyte 11) for the purpose of simple dimming in which switching between a colored state and a decolored state such as a smart window does not aim for displaying information, in the case of the configuration in which the first transparent electrode 2 is divided into a plurality of sub-electrodes, the electrode extraction portions of the respective sub-electrodes may be gathered at one place or the electrode extraction portions may be provided at positions corresponding to the respective sub-electrodes. (a) and (b) of FIG. 6 are plan views showing a specific example of the arrangement of the electrode extraction portion of the electrochromic device 100 or the electrochromic device 300 having the first transparent electrode 2 divided into three sub-electrodes in a region sealed with the electrolyte solution 8 or the solid electrolyte 11 with the seal 4. In the illustrated example, (a) of FIG. 6 shows a case where the electrode extraction portion is arranged at one location, and (b) of FIG. 6 shows a case where the electrode extraction portion is arranged at a position corresponding to each electrode. It is possible to change the transmission spectrum for each region corresponding to the sub-electrode by changing the voltage to be applied to each sub-electrode. With the configuration of (a) of FIG. 6, it is possible to simplify the assembling step of the dimming unit and to simplify wiring routing from individual regions. On the other hand, the first transparent electrode 2 includes a resistance component. For example, the current flowing through the first transparent electrode 2 is influenced depending on the distance from the electrode extraction portion and the thickness of the wiring. In the configuration of (b) of FIG. 6, it is possible to reliably operate the dimming unit at a position far from the electrode extraction portion (wiring connection portion), and it is possible to prevent a partial delay in the response speed of switching the transmission spectrum when a voltage is applied. In addition, with regard to routing to the electrode extraction portion, it is possible to avoid unnecessary voltage drop independently of the operation of the dimming layer by arranging the routed portion of the first transparent electrode 2 so as to reach the electrode extraction portion on the outside of the seal 4 or by arranging the routed portion on the lower side of the seal 4, as shown in (a) and (b) of FIG. 6. In addition, direct wiring may be connected from the first transparent electrode 2 to the electrode extraction portion. Further, in a case where one cell has a plurality of sub-electrodes of the first transparent electrode 2, the number of the facing second transparent electrodes 5 may be one or may be divided into a plurality of sub-electrodes like the first transparent electrode 2.

Further, in each of the above embodiments, the control of the transmission spectrum for one electrochromic device has been described, but the electrochromic device described herein may also be used in combination with other members. For example, the electrochromic device according to each of the above-described embodiments may also be used as a glass at the center of a triple glass structure. In this case, for incident light, interfacial reflection may occur at each of the resulting six interfaces between another glass arranged before and after the central glass and the gas enclosed between the glasses. When interfacial reflection occurs, since the transmittance of light including visible light is lowered, it is preferable to form an antireflection coat such as an Anti Reflective (AR) film, a Low Reflective (LR) film, or a Moth-eye (registered trademark) film on the glass surface serving as the interface.

SUMMARY

The electrochromic devices (100 and 300) according to Aspect 1 of the present invention are electrochromic devices (100 and 300) that modulate a transmission spectrum by applying a voltage, including the first transparent electrode (2) arranged on the first substrate (1), the second transparent electrode (5) arranged on the second substrate (6), and the nanocrystal layer (3) arranged on the first transparent electrode (2). The nanocrystal layer (3) and the second transparent electrode (5) are arranged to face each other, and the electrolyte (8/11) is interposed between the nanocrystal layer (3) and the second transparent electrode (5). The first transparent electrode (2), the second transparent electrode (5), and the nanocrystal layer (3) do not cause an oxidation-reduction reaction when a voltage is applied to modulate a transmission spectrum, and do not include an electrode that causes modulation of a transmission spectrum by an oxidation-reduction reaction when a voltage is applied.

According to the above configuration, it is possible to realize an electrochromic device that does not include a counter electrode material that changes the transmission spectrum by an oxidation-reduction reaction by voltage application. Therefore, no side reaction derived from the oxidation-reduction reaction of the counter electrode material occurs and an electrochromic device having excellent repetitive characteristics may be realized.

The electrochromic device (100) according to Aspect 2 of the present invention further includes the spacer (9) for keeping a distance in between the nanocrystal layer (3) and the second transparent electrode (5) constant in Aspect 1.

According to the above configuration, the distance between the nanocrystal layer and the second transparent electrode is kept constant. Therefore, it is possible to realize an electrochromic device which operates uniformly.

In the electrochromic devices (100 and 300) according to Aspect 3 of the present invention, the nanocrystal layer (3) is constituted by ITO nanocrystals in any one of Aspect 1 or 2.

According to the above configuration, it is possible to realize an electrochromic device that modulates the transmission spectrum in the near-infrared region.

The electrochromic devices (100 and 300) according to Aspect 4 of the present invention further include an overcurrent protection circuit that, in a case where it is detected that a current exceeding a predetermined threshold flows between the first transparent electrode (2) and the second transparent electrode (5), disconnects a connection between the electrodes so that no current flows between the electrodes, or switches a connection destination of the power supply (7) to a circuit different from a circuit connecting the electrodes in any one of Aspects 1 to 3.

According to the above configuration, it is possible to realize an electrochromic device that becomes disconnected from a circuit when a current exceeding a predetermined threshold is detected. Therefore, it is possible to realize an electrochromic device capable of suppressing degradation due to the flowing of an excessive current.

In the electrochromic devices (100 and 300) according to Aspect 5 of the present invention, the predetermined threshold value varies depending on energization time for the electrochromic device in Aspect 4.

According to the above configuration, it is possible to realize an electrochromic device that becomes disconnected from a circuit when a current exceeding a threshold value, which is different according to energization time, is detected. Therefore, it is possible to realize an electrochromic device capable of suppressing degradation due to the flowing of an excessive current based on a threshold value close to an actual current value.

In any one of Aspects 1 to 3, the electrochromic devices (100 and 300) according to Aspect 6 of the present invention further include an overcurrent protection circuit that, in a case where a charge amount charged in the electrochromic device exceeds a predetermined charge amount threshold value, stops applying an electrode between the first transparent electrode (2) and the second transparent electrode (5) of the electrochromic device, or lowers an absolute value of a voltage to be applied.

According to the above configuration, when the amount of electric charge charged in the electrochromic device exceeds a predetermined charge amount threshold value, it is possible to realize an electrochromic device that stops or lowers the voltage to be applied. Therefore, it is possible to realize an electrochromic device capable of suppressing degradation due to the flowing of an excessive current based on a predetermined charge amount threshold value.

In the electrochromic devices (100 and 300) according to Aspect 7 of the present invention, in any one of Aspects 1 to 6, the first transparent electrode (2) is divided into a plurality of sub-electrodes corresponding to a plurality of regions.

According to the above configuration, it is possible to realize an electrochromic device in which the first transparent electrode has a plurality of sub-electrodes for one cell. Therefore, it is possible to realize an electrochromic device which is not limited by the size of the first transparent electrode.

In the electrochromic devices (100 and 300) according to Aspect 8 of the present invention, in Aspect 7, the second transparent electrode (5) is divided into a plurality of sub-electrodes corresponding to a plurality of regions.

According to the above configuration, it is possible to realize an electrochromic device having the first transparent electrode and the second transparent electrode divided into a plurality of sub-electrodes for one cell. Therefore, it is possible to change, by changing the voltage to be applied to each sub-electrode, the transmission spectrum for each region corresponding to the sub-electrode.

The smart window according to Aspect 9 of the present invention includes the electrochromic device (100 or 300) according to any one of Aspects 1 to 8.

According to the above configuration, it is possible to realize a smart window having excellent repetitive characteristics.

The present invention is not limited to the above-described embodiments, but various modifications are possible within the scope indicated in the claims, and embodiments obtained by appropriately combining technical means disclosed in different embodiments are also included in the technical scope of the present invention. Further, it is possible to form new technical features by combining technical means disclosed in each embodiment.

CROSS-REFERENCE TO RELATED APPLICATIONS

This application claims the benefit of priority to Japanese Patent Application: Japanese Patent Application No. 2016-

026138 filed on Feb. 15, 2016, and all of the content thereof is included in this document by referring to the application.

INDUSTRIAL APPLICABILITY

The present invention may be applied to a smart window using an electrochromic device.

REFERENCE SIGNS LIST

1 first substrate
2 first transparent electrode
3 nanocrystal layer
4 seal
5 second transparent electrode
6 second substrate
7 power supply
8 electrolyte solution
9 spacer
10 counter electrode material
11 solid electrolyte
100, 300 electrochromic device

The invention claimed is:

1. An electrochromic device that modulates a transmission spectrum by applying a voltage, comprising:

a first transparent electrode arranged on a first substrate;

a second transparent electrode arranged on a second substrate; and a nanocrystal layer arranged on the first transparent electrode, wherein the nanocrystal layer and the second transparent electrode are arranged to face each other, an electrolyte is interposed between the nanocrystal layer and the second transparent electrode, and the first transparent electrode, the second transparent electrode, and the nanocrystal layer do not cause an oxidation-reduction reaction when a voltage is applied to modulate a transmission spectrum, and do not include an electrode that causes modulation of a transmission spectrum by an oxidation-reduction reaction when a voltage is applied.

2. The electrochromic device according to claim 1, further comprising a spacer for keeping a distance in between the nanocrystal layer and the second transparent electrode constant.

3. The electrochromic device according to claim 1, wherein the nanocrystal layer contains tin-doped indium oxide (ITO) nanocrystals.

4. The electrochromic device according to claim 1, further comprising an overcurrent protection circuit that, in a case where it is detected that a current exceeding a predetermined threshold flows between the first transparent electrode and the second transparent electrode, disconnects a connection between the first transparent electrode and the second transparent electrode so that no current flows between the first transparent electrode and the second transparent electrode, or switches a connection destination of a power supply to a circuit different from a circuit connecting the first transparent electrode and the second transparent electrode.

5. The electrochromic device according to claim 4, wherein the predetermined threshold value varies depending on energization time for the electrochromic device.

6. The electrochromic device according to claim 1, further comprising an overcurrent protection circuit that, in a case where a charge amount charged in the electrochromic device exceeds a predetermined charge amount threshold value, stops applying a voltage between the first transparent electrode and the second transparent electrode of the electrochromic device, or lowers an absolute value of a voltage to be applied.

7. The electrochromic device according to claim 1, wherein the first transparent electrode is divided into a plurality of sub-electrodes corresponding to a plurality of regions.

8. The electrochromic device according to claim 7, wherein the second transparent electrode is divided into a plurality of sub-electrodes corresponding to a plurality of regions.

9. A smart window comprising the electrochromic device according to claim 1.

* * * * *